United States Patent [19]
Kendall

[11] Patent Number: 5,711,542
[45] Date of Patent: Jan. 27, 1998

[54] TRAILER HITCH ADAPTER

[75] Inventor: Donald H. Kendall, Lapeer County, Mich.

[73] Assignee: The United States of America as represented by the Secretary of the Army, Washington, D.C.

[21] Appl. No.: 613,735

[22] Filed: Feb. 12, 1996

[51] Int. Cl.$^6$ .................... B60D 1/54; B60D 1/30
[52] U.S. Cl. .................... 280/491.4; 280/491.1
[58] Field of Search .................... 280/491.1, 491.3, 280/491.4, 415.1, 416.1, 456.1, 478.1, 482, 491.5, 455.1

[56] References Cited

U.S. PATENT DOCUMENTS

| | | | |
|---|---|---|---|
| 4,266,800 | 5/1981 | Hawkins | 280/491.4 |
| 5,346,243 | 9/1994 | Boeck | 280/491.4 |

*Primary Examiner*—Paul N. Dickson
*Attorney, Agent, or Firm*—Peter A. Taucher; David L. Kuhn

[57] ABSTRACT

A hitch adapter serves as a connection between a prime mover and a towed vehicle and permits the connection to be selectively configured for on-road or off-road travel. The adapter comprises a beam which has an eye at its fore end hooked to the prime mover and which has apertures at the aft end for engagement with the tongue of the towed vehicle. Fixed atop and under the beam are plates apertured to provide multiple arm mount sites on either side of the beam. A jointed arm swings on either side of the beam at selected ones of the mount sites and a brace arm swingably mounts on either side of the beam at other selected mount sites. The jointed arms include fixed length portions hinged to the brace arms and variable length portions hinged to the fixed length portions. The jointed arms also include releasable lock mechanisms for preventing relative movement between their fixed length and variable length portions. The adapter further comprises feet on the jointed beam that swing toward or away from the prime mover in concert with swinging of the brace arms, the fixed length portions and the variable length portions.

7 Claims, 2 Drawing Sheets

TRAILER HITCH ADAPTER

GOVERNMENT USE

The invention described here may be made, used and licensed by or for the U.S. Government for governmental purposes without paying me royalty.

BACKGROUND AND SUMMARY

Military automotive land vehicles, or prime movers, must tow trailers both on roads at normal highway speeds and over terrain at relatively high speeds. The best hitch connection between the prime mover and trailer for highway travel is not the same as the best hitch connection for off-road travel. Typical hitch connections for military vehicles are design compromises that adequately but not optimally adapt these vehicle for both on-road and off-road travel.

My invention is a hitch adapter which allows a hitch connection to easily be converted between an optimal on-road configuration and an optimal off-road configuration. The hitch adapter is highly adjustable, can be used on virtually any present combination of prime mover and trailer. I believe that my adapter will also allow new combinations of prime movers and trailers that are not presently considered practicable.

The adapter has a beam hooked at its fore end to the prime mover. The adapter has apertures at its aft end engaging a trailer tongue. Fixed to the beam's top and bottom are apertured plates having multiple pivot mounts on each side of the beam. Jointed arms swing on both sides of the beam about first pivot mounts. Brace arms swing on each side of the beam about second pivot mounts. The jointed arms have solid arm segments hinged to the brace arms and have other, variable length segments hinged to solid arm segments. At the juncture between the solid arm segments and the variable-length arm segments are releasable lock mechanisms which selectively allow or prevent relative movement between jointed arms' segments. The adapter has feet swivelled to the outer ends of the jointed arms. These feet swing toward or away from the prime mover in concert with the brace arms, the solid arm segments and the variable length arm segments. In the adapter's off-road configuration, the feet contact the prime mover and prevent lateral swing of the beam. Consequently, the lateral swing axis of the trailer relative to the prime mover is at the aft end of the beam. In the adapter's on-road configuration, the feet are swung away from the prime mover so that the trailer's swing axis is repositioned to the fore end of the beam. The repositioning of the trailer's swing axis adapts the prime mover and trailer to changes between on-road and off-road travel.

DETAILED DESCRIPTION

Figure 1:
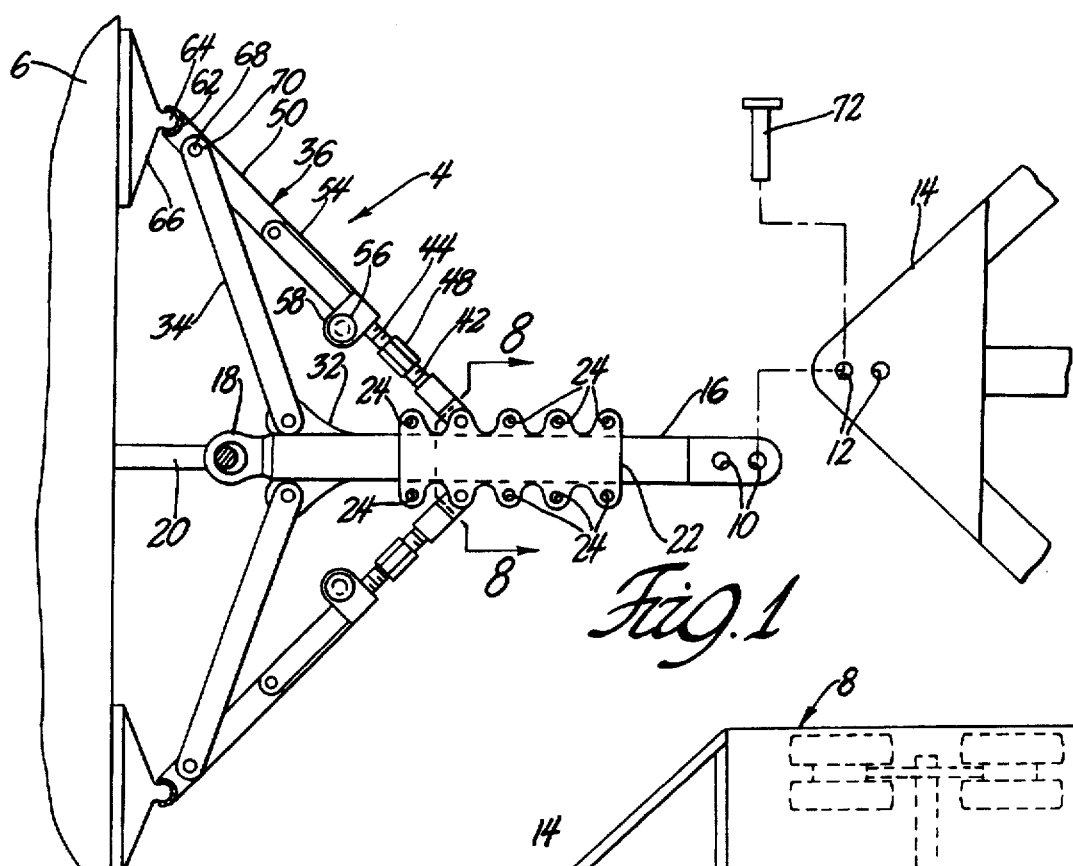
FIG. 1 shows a plan view of the hitch adapter in an off-road configuration and shows connections of the adapter to a prime mover and a trailer.
Figure 2:
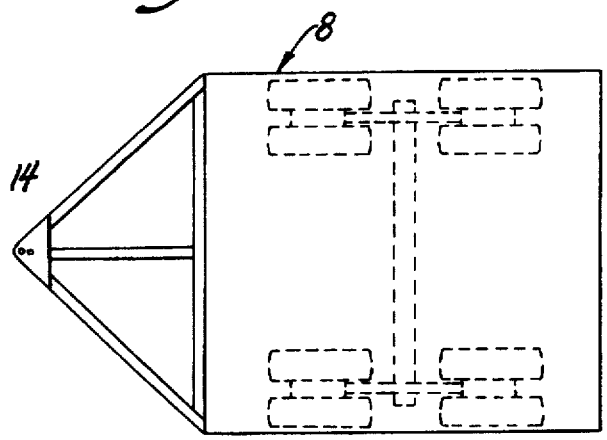
FIG. 2 is a plan view of a typical trailer for which the adapter is used.

FIG. 1 shows hitch adapter 4 mounted to a prime mover 6, which is typically a military cargo carrier capable of off-road travel. Adapter 4 connects to trailer 8 (FIG. 2) by first aligning one or both of the adapter's terminus apertures 10 with complimentary tongue apertures 12 in the trailer's junction plate 14. Then one or more pins 72 are inserted through the aligned apertures.

Adapter 4 comprises a center beam 16 having the aforementioned terminus apertures at the aft end and a conventional eye 18 at the fore end for connecting adapter 4 to prime mover 6. Eye 18 accommodates a standard hook 20 fixed to prime mover 6, hook 20 being shown in cross section at its engagement with eye 18. Center beam 16 additionally comprises apertured flanges 32 at the beam's fore end, the flanges providing hinge connection points between beam 16 and swingable brace arms 34.

Figure 3:
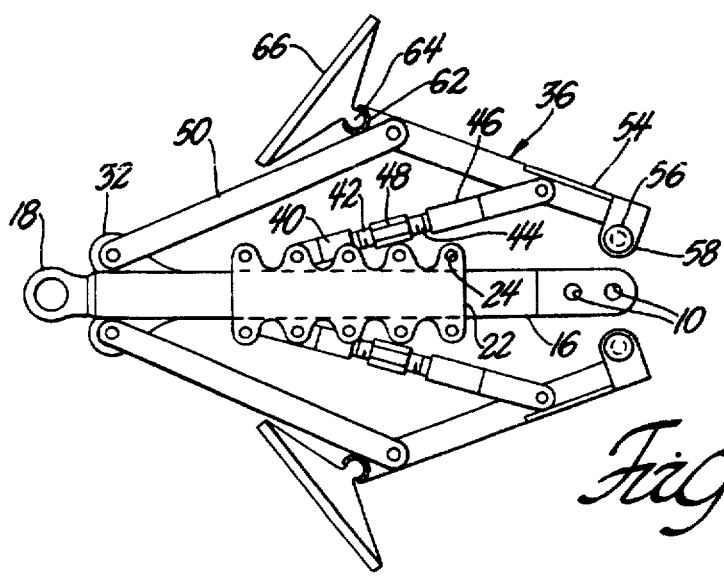
FIG. 3 is a plan view of the adapter in an on-road configuration.
Figure 8:
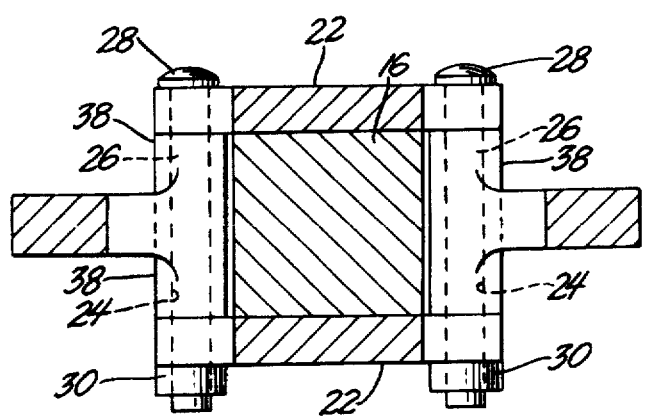
FIG. 8 is a cross sectional view taken along line 8—8 in FIG. 1.

Fixed intermediate the ends of center beam 16 are identical elongate mounting plates 22, one plate 22 being atop beam 16 and the other plate (FIG. 8) being on the bottom of beam 16. Holes 24 in the top and bottom plates align with each other and closely receive shanks 26 of hinge pins 28 (FIG. 8), which can be retained in plates 22 by conventional nuts 30. Preferably, as shown in FIGS. 1 and 3, holes 24 are in rounded protrusions extending outboard from beam 16. As an option, the protrusions can be integral with beam 16 and can extend directly therefrom, and the remaining portions of plates 22 can be eliminated. By this option, the protrusions with holes 24 replace plates 22 as arm mounting elements.

Figure 4:
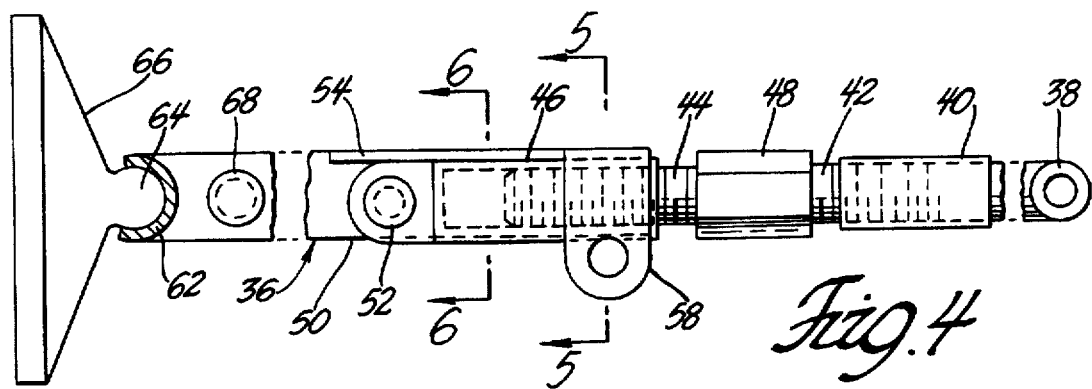
FIG. 4 is a plan view of the jointed arm of the adapter.
Figure 5:
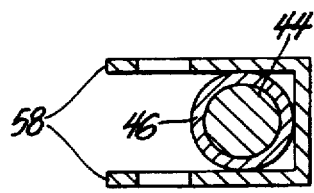
FIG. 5 is a view taken along line 5—5 in FIG. 4
Figure 6:
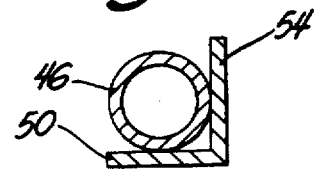
FIG. 6 is a view taken along line 6—6 in FIG. 4.

Hinged between brace arms 34 and plates 22 are jointed pivot arms 36, one of which is seen in detail in FIG. 4. At the inner, plate engagement end of arm 36 is a rotatable sleeve 38 (FIG. 8) which closely fits between plates 22 and which fits closely to pin shank 26. Adjacent the pivot arm's plate engagement end is a first internally threaded socket 40 (FIG. 4) receiving a first threaded rod 42. Pivot arm 36 has a second threaded rod 44 engaging a second internally threaded socket 46, the second rod and socket being threaded oppositely with respect to the first rod and socket. Rods 42 and 44 are solidly connected, preferably by a multi-faced, cross-sectionally hexagonal tool engagement member 48 which allows the use of a wrench or like tool to simultaneously turn both rods. The aforementioned rods and sockets comprise means to shorten or lengthen arm 36 when member 48 is rotated. It may be desired in some cases to use a more conventional structure, such as a turnbuckle arrangement, instead of these rods and sockets. In any event, either the turnbuckle arrangement or the assembly of the rods, sockets and tool engagement member may simply be regarded as an adjustable-length arm segment of pivot arm 36.

Figure 7:
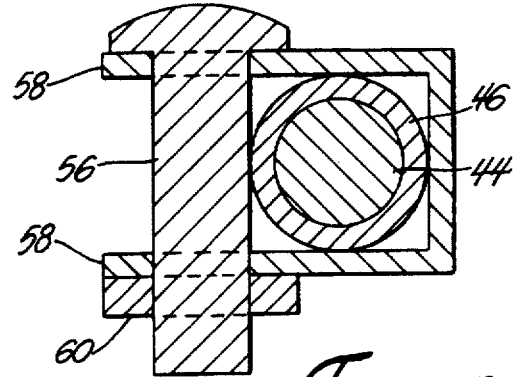
FIG. 7 is a cross sectional view of the releasable locking mechanism that selectively prevents relative motion between segments of the jointed arm.

As seen in FIG. 4, socket 46 is pivotally connected to arm segment 50 by hinge pin 52. An elongate plate-like rotation stop 54 is fixed to segment 50 and limits rotation of socket 46 relative to segment 50, stop 54 preventing socket 46 from rotating counterclockwise in FIG. 4. When jointed pivot arm 36 is in the straight configuration of FIG. 4, socket 46 lies along and contacts stop 54. A removable keeper pin 56 (FIG. 7) passes through tabs 58 which are fixed to segment 50, and pin 56 contacts socket 46 so as to lock socket 46 against stop 54. A nut 60, or other suitable retainer such as a cotter pin, prevents escape of pin 56 from tabs 58.

Returning to FIG. 1, at the opposite end of arm 36 from the plate engaging end is a round socket 62 holding a ball 64, which connects to swivel foot 66. Near socket 62 is pin 68, which hinges outboard end 70 of brace arm 34 to a zone of arm segment 50 closer to socket 62 than to socket 46. In FIG. 1, pivot arm 36 is in its straight configuration described in conjunction with FIG. 4, and thus arm 36 is a unitary, rigid member. Hence, brace arm 34 holds arm 36 in fixed position so that arm 36 fixes foot 66 against prime mover 6, whereby hitch adapter 4 can not swing side to side about hook 20. Optionally, a slight gap may be allowed between feet 66 and prime mover 6 so that the adapter's side to side swing is severely limited but not completely prevented. Rotating member 48 will shorten or lengthen arm 36 so as to loosen or tighten the engagement of foot 66 with prime mover 6. Adding to the adaptability provided by rotating member 14 is the ability to hingedly attach arms 36 to beam 16 at any of plate holes 24. Consequently, adapter 4 can be mounted to a wide variety of prime movers.

Figure 9:
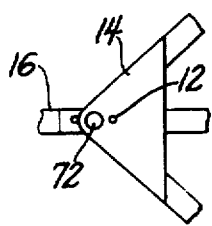
FIGS. 9 and 10 are detail views of the connection between the adapter's beam and the junction plate of the trailer.

When adapter 4 is in the FIG. 1 configuration, trailer 8 will be connected to the adapter as shown by detail FIG. 9, where pin 72 passes through apertures 12 and 10, whereby trailer 8 can swing side to side about pin 72. Since pin 72 is further from prime mover 6 than hook 20, a greater degree of side to side trailer swing can be tolerated than if the trailer were connected directly to hook 20. Greater allowable side to side trailer swing enhances the prime mover's ability to tow the trailer over off-road terrain.

Figure 10:
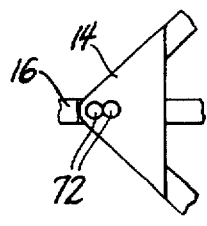

To change adapter 4 from its off-road configuration of FIG. 1, keeper pin 56 is removed from tabs 58, so that pivot arm 36 can bend with respect to the axis of hinge pin 52 (FIG. 4). The bending of pivot arm 36 allows adapter 4 to be folded from the FIG. 1 position to the on-road position shown in FIG. 3. It is preferred that socket 40, rod 42, rod 44 and socket 46 are all sized to fit between plates 22 next to central beam 16. The adapter can be held in the FIG. 3 position by any suitable method. Such a method can be, for example, using cords to tie rods 42 to central beam 16. It is contemplated that trailer 8 will then be connected to adapter 4 either as shown in FIG. 9 or as shown in FIG. 10. In FIG. 10, two pins 72 extend through two sets of paired apertures 10 and 12 so that trailer 8 does not swing side to side relative to the aft end of adapter 4. Rather, adapter 4 becomes a forward extension of trailer 8, whereby trailer 8 and adapter 4 swing as a unit from side to side about hook 20.

I wish it to be understood that I do not desire to be limited to the exact details of construction or method shown herein since obvious modifications will occur to those skilled in the relevant arts without departing from the spirit and scope of the following claims.

What is claimed is:

1. A hitch adapter for connecting one vehicle to another vehicle, comprising:
    a beam;
    means to connect the adapter to the one vehicle;
    means to connect the adapter to the other vehicle;
    first threaded members pivoted to the beam;
    first complimentary members threaded to the first threaded members;
    second complimentary members threaded oppositely from the first complimentary members and fixed relative to the first complimentary members;
    second threaded members engaging the second complimentary members;
    arm segments having hinge connections to the second threaded members;
    brace arms hinged to the beam and to the arm segments;
    means on the arm segments for limiting swing of the arm segments about the hinge connections;
    means for holding the second threaded members stationary against the limiting means.

2. The hitch adapter of claim 1 wherein the holding means comprises:
    tabs on the arm segments;
    lock pins in the tabs and removable therefrom, the lock pins holding the second threaded members against the limiting means.

3. The adapter of claim 1 having feet connected to the arm segments, the feet disposed at an aft portion of the one vehicle during an off-road configuration of the adapter so that the feet prevent at least some side-to-side swing of the adapter.

4. The adapter of claim 2 wherein:
    the feet are closer to the one vehicle than to the beam in the off-road configuration;
    the feet are swingable from the aft portion of the one vehicle to a second position where the feet are closer to the beam than to the aft portion.

5. A hitch adapter for connecting a towing vehicle to a towed vehicle, comprising:
    a beam connectable between the vehicles, the beam having a fore end and an aft end;
    means to connect the fore end to the towing vehicle;
    means to connect the aft end to the towed vehicle;
    two or more arm mount sites on either side of the beam;
    a jointed arm swingably mounted on either side of the beam at a selected one of the mount sites;
    a brace arm swingably mounted on either side of the beam at another selected mount site;
    fixed length portions of the jointed arms hinged to the brace arms;
    variable length portions of the jointed arms hinged to the fixed length portions;
    means on the jointed arms for selectively preventing relative rotation between the fixed length portions and the variable length portions;
    feet on the jointed arms swingable toward or away from the towing vehicle in concert with swinging of the brace arms, the fixed length portions and the variable length portions.

6. The adapter of claim 4 wherein the preventing means further comprises:
    rotation stops on the jointed arms limiting relative rotation between the fixed length portions and the variable length portions;
    tabs on ones of the portions spaced apart to allow receipt therebetween of others of the portions;
    lock pins passed through the tab apertures and removable therefrom, the lock pins holding the second sockets against the stops.

7. An adapter for converting a hitch connection between vehicles from an on-road configuration to an off-road configuration and vice-versa, comprising:
    a central beam;
    mounting plates fixed atop and on the bottom of the beam;
    a hook engagement eye on a fore end of the beam;
    one or more terminus apertures at an aft end of the beam;

a pair of flanges at the fore end of the beam;

first internally threaded sockets pivoted to the plates;

first rods threaded to the first socket;

second rods threaded oppositely from the first rod;

tool engagement members fixed between the first and second rods;

second sockets threaded to the second rods;

arm segments;

first hinge connections, the first hinge connections being between the arm segments and the second sockets;

feet swivelled to the arm segments;

brace arms hinged to the flanges;

second hinge connections, the second hinge connections being between the brace arms and the arm segments;

rotation stops on the arm segments limiting swing of the arm segments about the first hinge connections;

tabs on the arm segments spaced apart to allow receipt therebetween of the second socket;

tab apertures defined by the tabs;

lock pins passed through the tab apertures and removable therefrom, the lock pins holding the second sockets against the stops, thereby preventing relative movement between the arm segments and the second sockets.

* * * * *